United States Patent [19]

Fujita

[11] Patent Number: 4,541,297
[45] Date of Patent: Sep. 17, 1985

[54] ROTATING SHAFT OF ROLLER SCREW STRUCTURE AND ITS DRIVEN DEVICE

[76] Inventor: Kazuo Fujita, No. 1, Tohkadai, 1-Chome, Seto City, Aichi Prefecture, Japan

[21] Appl. No.: 498,503

[22] Filed: May 26, 1983

[30] Foreign Application Priority Data

Jun. 12, 1982 [JP] Japan ................................ 57-101124

[51] Int. Cl.[4] ........................ F16H 55/02; F16H 55/14
[52] U.S. Cl. .............................. 74/424.6; 74/424.8 R; 74/465
[58] Field of Search .................... 74/89.15, 443, 424.7, 74/458, 424.8 R, 424.6, 89.14, 465

[56] References Cited

U.S. PATENT DOCUMENTS

| 219,706 | 9/1876 | Flynn | 74/458 |
| 647,491 | 4/1900 | Hoffmann | 74/424.7 |
| 1,393,886 | 10/1921 | Doty | 74/443 |
| 1,424,203 | 8/1922 | Keller | 74/443 |
| 3,698,257 | 10/1972 | Ballentine | 74/424.8 R |
| 4,285,249 | 8/1981 | Kume | 74/89.15 |
| 4,439,053 | 3/1984 | Pelz | 74/443 |
| 4,450,040 | 5/1984 | Zodrow | 74/443 |

FOREIGN PATENT DOCUMENTS

| 126464 | 6/1928 | France | 74/458 |
| 390065 | 3/1933 | United Kingdom | 74/443 |

Primary Examiner—Lawrence J. Staab
Attorney, Agent, or Firm—Fred Philpitt

[57] ABSTRACT

A rotating shaft is provided with a large number of support shafts arranged on a helical line, and the support shafts are provided with rotatably supported rollers driven members are provided which are interlockingly engaged mutually with the rotating shaft, and the driven members are provided with projections having engaging surfaces to be engaged with the rollers provided on the rotating shaft.

11 Claims, 21 Drawing Figures

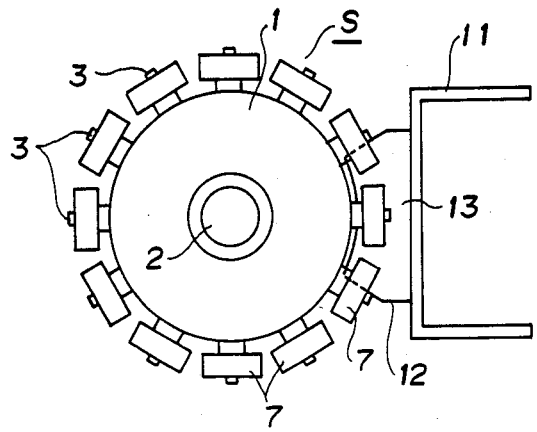
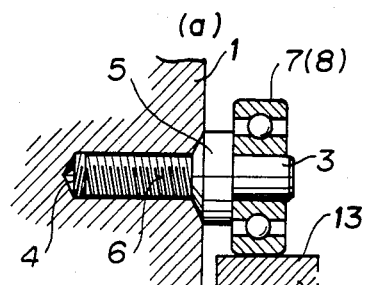
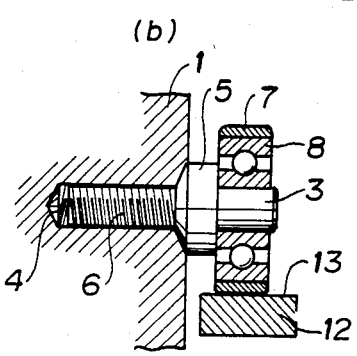
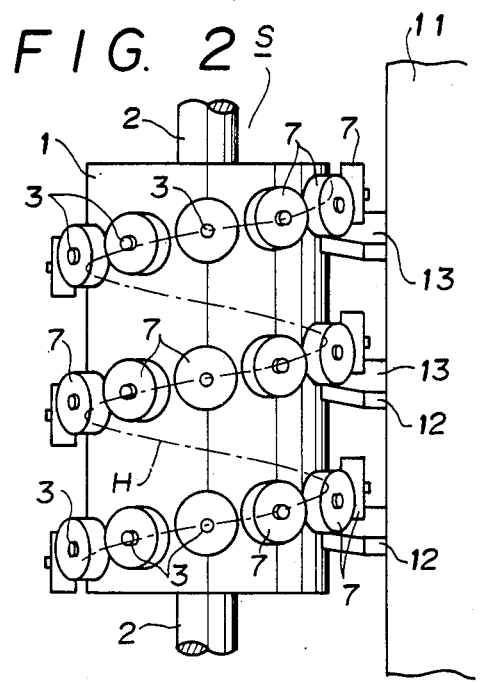
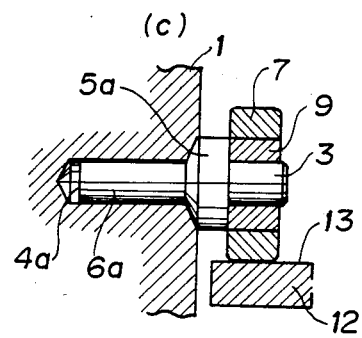
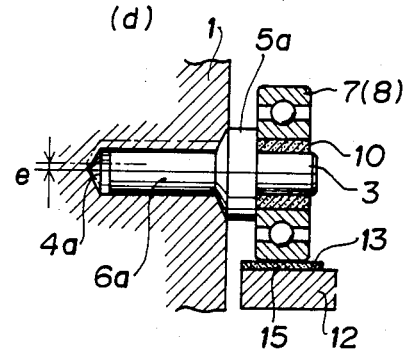
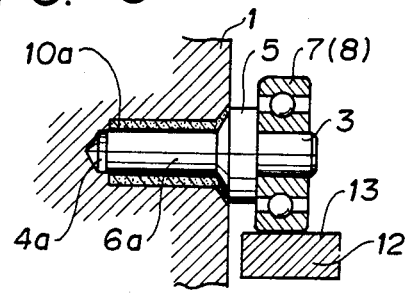

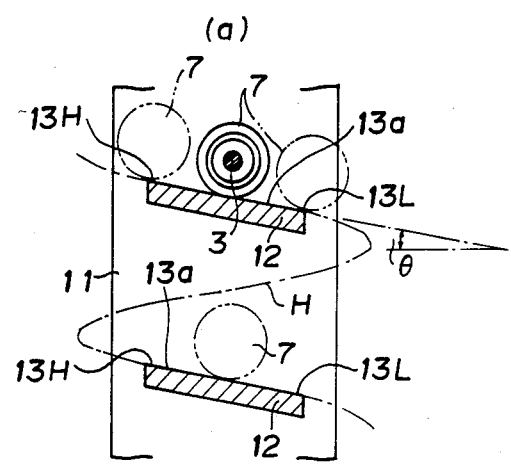
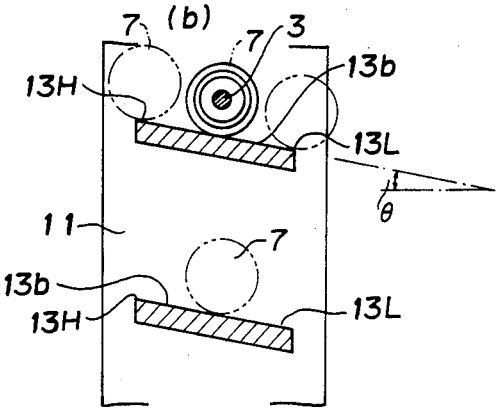
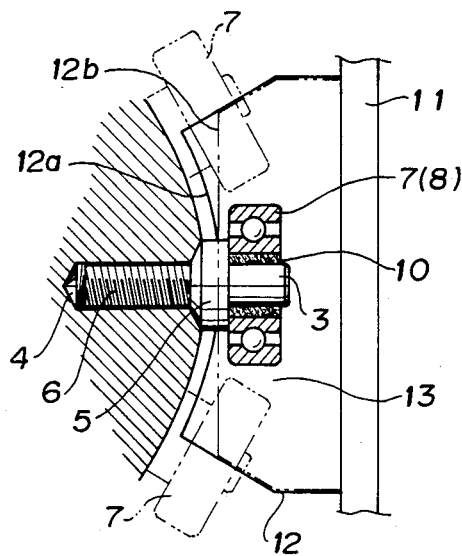
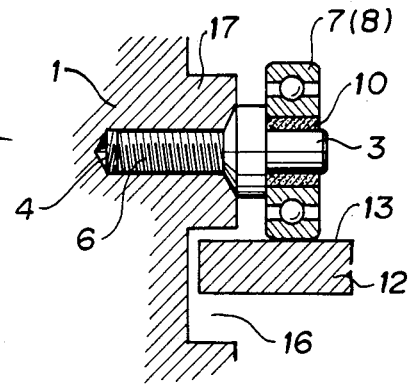
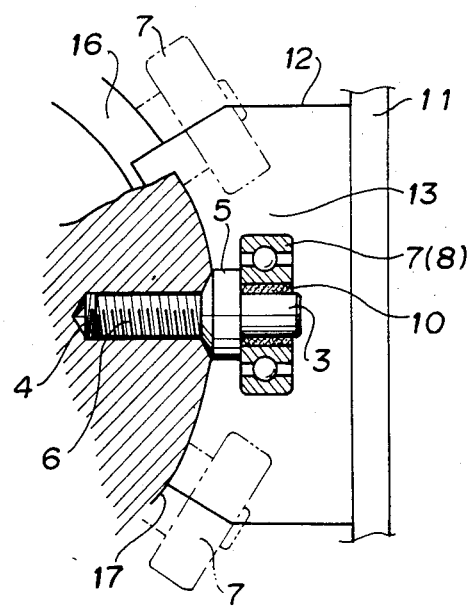

ROTATING SHAFT OF ROLLER SCREW STRUCTURE AND ITS DRIVEN DEVICE

BACKGROUND OF THE INVENTION

This invention relates to a rotating shaft of the roller screw structure and its driven device, and more particularly, this invention is composed of a rotating shaft provided with a large number of support shafts arranged on a helical line of the shaft proper. Rotatable rollers are included on the support shafts and driven members are provided with a large number of projections having engaging surfaces for engagement with the rollers of the rotating shaft.

As is well known, a worm mechanism consisting of a worm and a worm wheel or rack is broadly used as a power transmitting device for normally rotating the worm wheel with the worm at the prime mover side, linearly shifting the rack or rotatably shifting the worm along the fixed rack. Particularly, when the helix angle of the worm is made smaller, it is useful for prevention of reversal rotation of the device or automatic clamping mechanism and the like. However, the worms and the like that formed known worm mechanism required high technique in machining owing to the high precision that is required.

SUMMARY OF THE INVENTION

An object of this invention is to provide a rotating shaft of the roller screw structure in which a large number of support shafts are provided and arranged on the helical line of the rotating shaft proper. Rollers are supported on the support shafts, and driven members provided with projections having engaging surfaces are engaged with the rollers provided on the rotating shaft of the roller screw structure. With this arrangement, the smooth rotating power is secured by means of the rollers. Also the working efficiency per 1 piece of the roller can be highly improved by only rotatably supporting the rollers of a minimum requirement on the helical line of the shaft proper.

Another object of this invention is to facilitate the application of the rotating shaft of the roller screw structure a large number of support shafts are provided on the helical line of the rotating shaft proper, and rollers are supported on the support shafts. Driven members provided with projections having engaging surfaces are engaged with the rollers provided on the rotating shaft of the roller screw structure. The invention relates to a broad technical field as a power transmitting device for transmitting the power or driving by making the one member at the prime mover side and the other member at the driven side effect mutual interlocking engagement.

BRIEF DESCRIPTION OF THE DRAWINGS

FIG. 1 is a plan of the roller screw,

FIG. 2 is an elevational view of the roller screw

FIGS. 3(a)-(e) are enlarged cross sections showing detailed portions of the roller structure, and showing modifications of the support shaft and the roller and its engaged condition, FIGS. 4(a) and (b) are enlarged side views showing the side mode of the projection, and specifically in FIG. 4(a), the engaging surface with the roller is formed in spiral curved surface and in FIG. 4(b), the engaging surface with the roller is formed in mere inclined surface, FIG. 5 is an enlarged plan showing the plan mode of the roller and the projection, FIGS. 6(a)-(f) are perspective views showing each modification of the rail member and the projection, FIG. 7 to FIG. 9 relate to the second embodiment, wherein FIG. 8 is an enlarged vertical cross section showing a detailed portion of the roller screw, FIG. 9 is an enlarged plan similar to FIG. 5, FIG. 10 and FIG. 11 are views showing the embodiment in which this invention is applied to a lifting device of the step portion, wherein

DETAILED DESCRIPTION OF THE INVENTION

Figure 6:
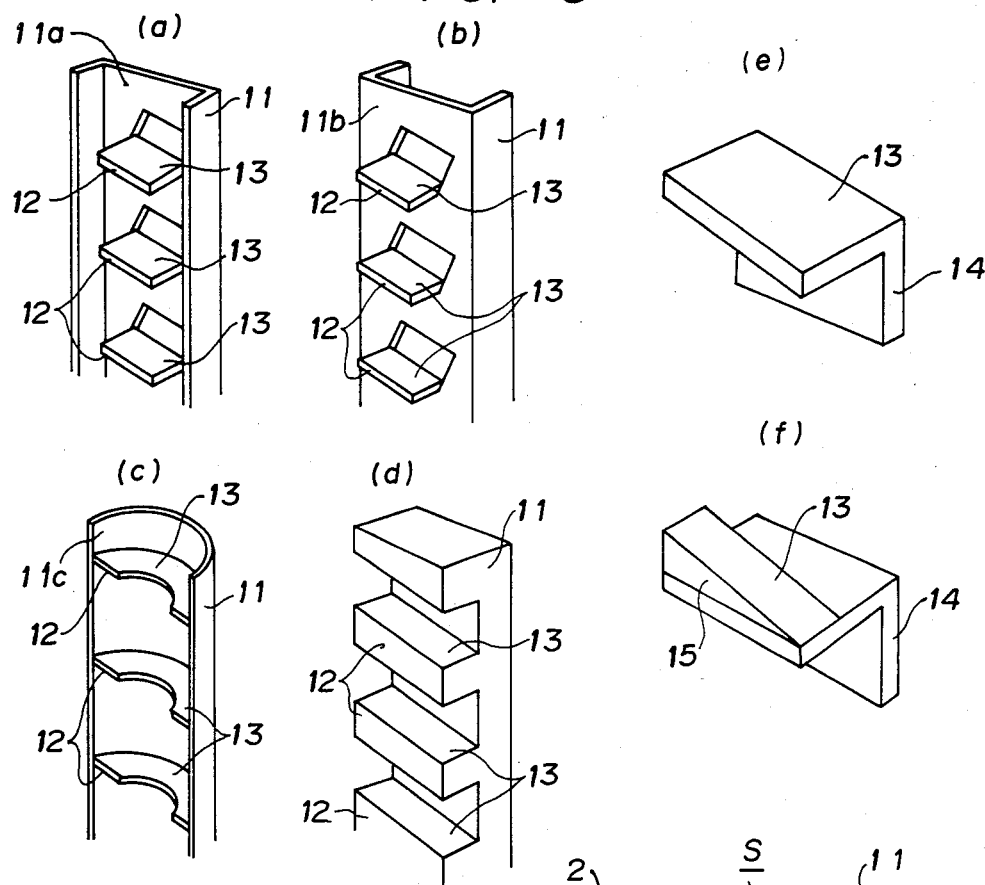

The rotating shaft of the roller screw structure according to this invention is represented by letter S, and in FIG. 1 and FIG. 2, the principle drawing of the rotating shaft S of the roller screw structure is shown, and in FIG. 3, a detailed portion is shown. The numeral 1 denotes the shaft proper at the prime mover side, and is of columnar shape or cylindrical shape, and normally, is rotatable reversibly. Numeral 2 denotes rotating shafts projected on both upper and lower ends of the shaft proper 1. The numeral 3 denotes a large number of support shafts projected at equal intervals along the helical line H on the shaft proper 1. The support shafts 3 are projected in the radial direction from the outer peripheral surface of the shaft proper 1 in the plan view. Each support shaft 3 is firmly fixed by screwing and fixing a screw shaft 6 with a stationary nut 5 which is formed integral with the support shaft 3 into a threaded hole 4 formed on the shaft proper 1 as shown in FIGS. 3(a) and (b), or by fitting and fixing a shaft 6a with flange 5a formed integral with the support shaft 3 into a hole 4a formed on the shaft proper 1 as shown in FIGS. 3(c) and (d), or by any means of directly welding the support shaft 3 on the outer peripheral surface of the shaft proper 1. Numeral 7 denotes a roller made of metal, hard rubber, hard plastics and the like. A roller 7 is rotatably supported on each of the support shafts 3. When the roller 7 is made of metal, as shown in FIGS. 3(a) and (d), the roller 7 itself acts as the bearing member such as roller bearing or bearing metal, but when the roller 7 is made of not only the metal but also any of hard rubber, hard plastics and the like, as shown in FIGS. 3(b) or (c), bearing material such as the roller bearing 8 (FIG. 3(b)) or the bearing metal 9 (FIG. 3(c)) is fitted between the roller 7 and the support shaft 3, and thus, the roller 7 is rotatably supported. In FIG. 3(d), numeral 10 denotes a soft elastic material such as rubber or plastics as compared with the support shaft 3 and the roller 7, and is of the cylindrical or band plate type, and is fitted between the support shaft 3 and the roller 7 as required. The elastic material 10 functions as the cushion material for correcting any error in the case where the axis cores of the support shaft 3 to be provided at equal intervals along the helical line H of the shaft proper 1 are formed slightly eccentric, shown as (e) in the machining. However, when the roller 7 is made of rubber or plastics as shown in FIGS. 3(b) and (c), and the roller 7 itself functions as the cushion material for adjusting the error, the elastic material 10 as mentioned in the foregoing is one optional one. In FIG. 3(e), numeral 10a is the elastic material fitted to the shaft 6a with flange 5a, and is fitted and fixed to the hole formed on the shaft proper 1. As a result, the rotation of the roller 7 is smooth. The shaft side of the roller screw S in which a large number of the rollers 7 are axially supported along the helical line of the rotating shaft proper 1 is formed by the foregoing construction. Numeral 11 denotes a rail member for fixing or moving at the driven side and is disposed in parallel with one side portion of the shaft proper 1. The rail member is normally, disposed in any of the required directions, vertical direction, horizontal direction, inclined direction. Numeral 12 denotes projections of proper width at equal intervals along the rail member 11, and the upper surfaces of the projections 12 are formed as the engaging surfaces 13 for engagement with the rollers 7. The engaging surfaces 13 may comprise curved surfaces 13a including a spiral form having a gradient identical with that of the helic angle $\theta$ of the support shafts 3 or rollers 7 provided along the helical line H as shown in FIG. 4(a) in the side view, or may comprise the inclined surfaces 13b identical with the helix angle $\theta$ as shown in FIG. 4(b). Also, when the engaging surfaces 13 are made flush with the projections 12, as are the spiral curved surfaces 13a or the inclined surfaces 13b, the side of the projection 12 adjacent the shaft proper 1 is recessed in a half-arc shape as shown by the solid line of FIG. 5. Both sides are cut off, the projections 12a are bent downward or almost flat rectangular projections 12b as shown in the imaginary line in FIG. 5 are formed. The projections 12 are formed in such a way that either the inside concave portion 11a or the outside portion 11b of the channel like rail member 11 is raised to be integrally projected as shown in FIGS. 6(a) and (b). Alternatively, the projection are bulged or projected on the inner wall surface 11c of the half-arc shaped rail member as shown in FIG. 6(c) or racks are projected on one side surface 11d of the rail member 11 of the channel type as shown in FIG. 6(d). The angle like projection 14 includes an upper surface made to be the engaging surface 13 with the roller 7. Alternatively the elastic member 15 whose upper surface is made as the engaging surface with the roller 7 is fixed to the upper surface of the angle like projection 14 as shown in FIG. 6(f). The angle like projection 14 is welded and fixed to one side surface of the rail member 11 or is fixed by mounting means such as bolts and nuts or screws. At this time, the elastic member 15 provides a cushion function similar to that of the elastic material 10 as shown in FIG. 3(d), and may be pasted and fixed to the upper surface of each projection 12 and 14 shown in FIGS. 6(a) to (e). Any manufacturing error at the forming time of the projections 12 and 14 or at the fixing time can be adjusted by the resilient force thereof. Accordingly, the elastic materials 10 and 15 may be provided at both the roller 7 side and the projections 12 and 14 side, as shown in FIG. 3(d). It is of course possible to form the elastic materials at either of the rollers 7 side or the projections 12 and 14 side. As a result, the roller screw S functions as the rail member 11 is formed primarily at the driven side.

The roller screw S of the foregoing construction operates as follows. The shaft proper 1 at prime mover side is made rotatable reversibly, and also shiftable, and the rail member 11 is fixed and supported to be non-shiftable. The rollers 7 disposed and supported spirally on the outer peripheral surface of the shaft proper 1 are respectively engaged rotatably with the engaging surfaces 13 of the respective projections 12 provided on the rail member 11. Moreover, the geared motor connected to the rotating shaft 2 or other prime movers are driven in positive rotation. When the arrangement is made, the rollers 7 at the shaft proper 1 side are rotated by an optional width of the projection 12 along the high step portion 13H from the low step portion 13L of the engaging surfaces 13, and the succeeding rollers 7 are similarly rotatably engaged continuously. The entire shaft proper 1 smoothly rotates along the rail member 11, and rises or advances to travel and transfer. Also, on the contrary, when the rotating shaft 2 is reversely driven, the rollers 7 at the shaft proper 1 side rotatably move along the low step portion 13L from the high step portion 13H of the engaging surface 13 and as a result, the descending motion or retreating motion of the whole shaft proper 1 occurs.

Next, when the shaft proper 1 at the prime mover side is supported reversibly rotatable and is supported non-shiftably, and the other rail member 11 at the driven side is shiftably supported, the shaft proper 1 is rotated by the reversible rotational drive of the prime mover, and the rollers 7 supported on the shaft proper 1 are rotatably moved on the engaging surface 13 of the rail member 11, and the rail member 11 itself makes the descending motion or moves back and forth horizontally to travel and shift.

Although the rail member 11 is disclosed as being disposed at one side portion of the shaft proper 1, the rail member 11 may be disposed at both side portions of the shaft proper 1 as shown in FIGS. 6(a) to (d). Also, in this invention, the rail member 11 is described as a linear member, but the rail member 11 maay be bent in the middle or may be curved, and the interval of the projections 12 in the bent portion or the curved portion can be variably changed so that the travel and shift at the shaft proper 1 side along the curved portion are assured. Furthermore, in this invention, the rollers 7 may be formed in one layer in a spiral on the outer peripheral surface of the shaft proper 1, and the rollers 7 are interlocking engaged with the projection 12 at the rail member 11 side. Alternatively, the roller 7 may be disposed in double or triple layers on the outer peripheral surface of the shaft proper 1.

Figure 7:
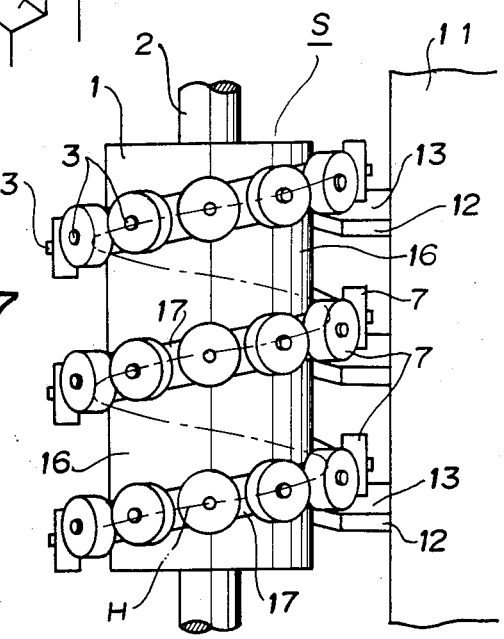
FIG. 7 is an elevation of the roller screw.

In FIG. 7 to FIG. 9, the second embodiment of the roller screw S according to this invention is illustrated. Numerals 16 and 17 denote the spiral concave portion and the spiral convex portions respectively which are spirally formed in concave and convex shapes on the outer peripheral surface of the shaft proper 1. The rollers 7 are rotatably supported on the support shafts 3 projected at equal intervals along the helical line H of the spiral convex portion 17. The end portions of the projections at the rail member 11 side are loosely fitted and supported to be bulged to the spiral concave portion 16, and the rollers 7 and the projections 12 adapted for interlockingly engagement. Other constructions similar to those shown in FIG. 1 to FIG. 7.

In this invention, the construction is provided in such a way that a large number of support shafts are provided on the helical line of the rotating shaft as described in the foregoing, and the rollers are rotatably supported on the support shafts to form the roller screw at the shaft side. In addition, the projections having the engaging surfaces for engagement with the rollers at the shaft side are provided on the other member 11 whereby the roller screw is formed so that the rotating smooth force through the rollers can be maintained and assured. The support of the required minimum rollers on the helical line of the shaft proper brings about the excellent working efficiency per 1 piece of the roller, and accordingly, provides various effects of broad application to various technical fields.

Figure 10:
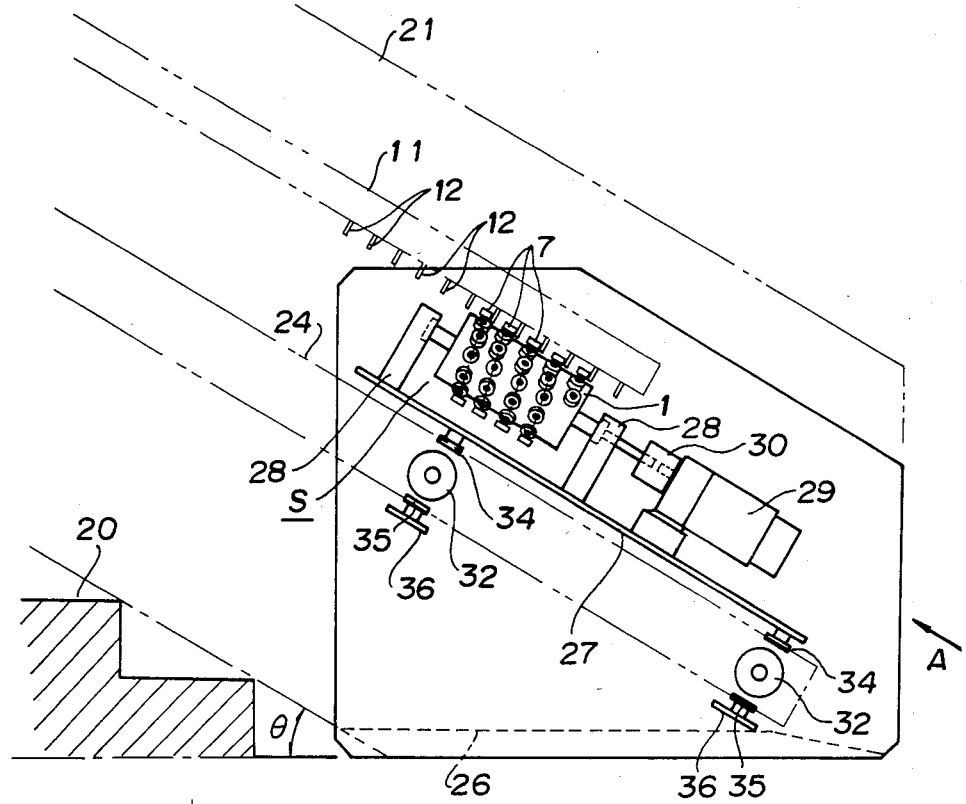
FIG. 10 is a side perspective view.
Figure 11:
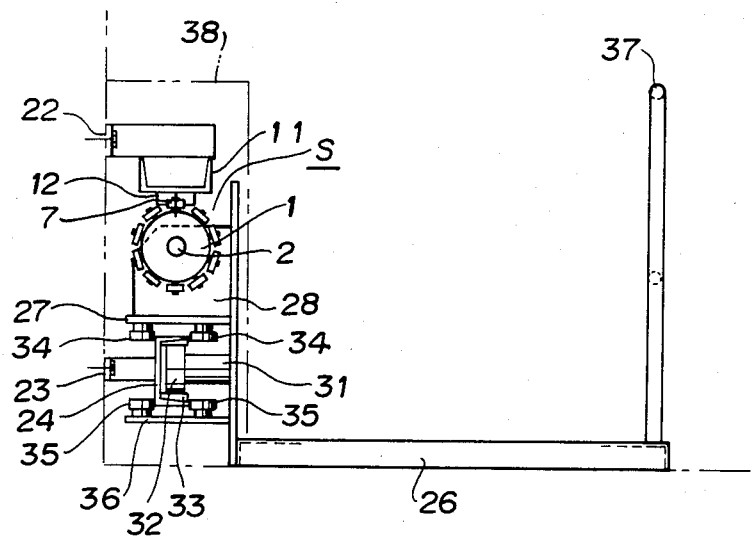
FIG. 11 is a perspective view taken along an arrow mark A of FIG. 10.

Next, an applied example in which the roller screw S of this invention is used will be described when the rotating shaft proper 1 is made at the prime mover side and is rotatably and shiftably supported. The other rail member 11 having the projection 12 for engagement with the rollers 7 at the shaft proper 1 side is fixed and supported. The roller structure is applied to the automatic lifting device that travels and drives in the optional inclined direction FIG. 10 and FIG. 11 disclose the preferred case for a handicapped person to ascend or descend stably on the steps while sitting on the wheel chair. Numeral 20 denotes the step with an optional inclined gradient $\theta'$, numeral 21 denotes the wall of the side portion of the step 20, and numerals 22 and 23 denote brackets for mounting and fixing the upper portion and lower portion respectively of the wall 21, the brackets being provided properly at intervals along the traveling direction. The upper bracket 22 is provided with the rail member 11 of the channel type in parallel with the inclined gradient $\theta'$ of the step 20, and the rail member 11 is provided with the projections 12 having the engaging surfaces 13 at equal intervals along the lower surface. Also, the lower bracket 23 is provided with the channel type guide rail 24 in parallel with the inclined gradient $\theta'$ of the step 20, the back surface of which is fixed. Numeral 25 denotes a plate like side frame, and a mount 26 is fixed and supported on the outside of the lower portion. Numeral 27 denotes a plate like support base which is projected toward the outside from almost the center portion of the side frame 25, and which is disposed in parallel with the side of the upper portion of the guide rail 24. Numeral 28 denotes bearing bases of the rotating shaft proper 1, one side of which is fixed to the side frame 25 and the lower portion of which is fixed and supported on the support base 27 and is disposed in the end and middle portions of upper part of the support base 27. With this arrangement, the rollers 7 disposed spirally on the outer peripheral surface of the shaft proper 1 are engaged and supported on the projections 12 of the rail member 11. Numeral 29 denotes a prime mover such as a geared motor disposed and fixed to the lower portion of the support base 27, and numeral 30 denotes a safety brake device disposed between the rotating shaft of the prime mover 29 and the rotating shaft 2 of the shaft proper 1, numeral 31 denotes support shafts projected at required intervals along the lower portion of the side frame 25, and numeral 32 denotes a roller supported on the tip portion of the support shaft 31, which roller is rotatable along the concave portion of the inside of the guide rail 24. Numeral 33 denotes a drive mat of the rollers fixed internally on the upper and lower portions of the concave portion of the inside of the guide rail 24, and numerals 34 and 35 denote rollers disposed at the upper portion respectively and the lower portion of the roller portions 32. A pair of the upper rollers 34 sandwich and support the upper portion of the guide rail 24 that is axially supported on the support shaft of the bottom portion of the support base 27. Numeral 36 denotes a support bracket projected and fixed to the lower portion of the side frame 25, and a pair of lower rollers 35 are axially supported on the support shaft of the upper portion and sandwich and support the lower portion of the guide rail 24. Numeral 37 denotes handrails erected and fixed to the outside portion or both side portions of the mount 26, and numeral 38 denotes a cover that covers the drive portion.

In operation, a handicapped person sitting in a wheel chair pushes the wheel chair on to the mount 26 and drives the prime mover 29 in a positive rotation. Simultaneous with the rotation of the shaft proper 1 by means of the safety brake device 30, the rollers 7 are sequentially engaged with the engaging surfaces 13 of the projections 12 and are rotatably moved. The roller screw S at the prime mover side, the prime mover 29, and the mount 26 are guided on the rail member 11 and the guide rail 24 and linearly travel and shift. The mount 26 is lifted to the upper end portion of the step 20. At this time, the lateral swing of mount 26 is prevented by the rollers 34 and 35 disposed at both side portions of the upper and lower guide rails 24 and the roller 32 that rotatably moves within the concave portion of the inside of the guide rail 24. Thus, the smooth lifting shift of the mount 26 is assured. Also, by the reversal drive of the prime mover 29, the descending motion of the mount 26 can be carried out similar to the foregoing.

Alternatively, although the description has been provided for the case of linear travel and shift on outside steps, it also be constructed to lift and shift on steps of a loop type or steps of the inside on the building.

What is claimed is:

1. A drive transmitting apparatus comprising:
   (a) a roller screw member including a rotatable central shaft, a plurality of support shafts projecting radially outwardly from said central shaft, said support shafts being arranged at equally spaced intervals along a helical line around said central shaft, a plurality of rollers rotatably mounted on said support shafts, said rollers including bearing means for mounting said rollers on said support shafts, and annular elastic means arranged around at least one end of said support shafts for correcting any error in the positioning of the axes of said shafts and respective rollers relative to said central shaft; and
   (b) a rail member arranged adjacent said roller screw member and parallel with the axis of said central shaft, said rail member including a plurality of equally spaced projections having inclined upper surfaces adapted for engagement with the surfaces of said rollers, the inclination of said projection surfaces being equal to that of the helical line of support shafts on said roller screw member;
   (c) one of said roller screw and rail members being adapted for axial movement and the other of said roller screw and rail members being fixed against axial movement, whereby when said central shaft is rotated, said roller surfaces roatatably engage said projection surfaces and said movable member is moved in the axial direction.

2. A drive transmitting apparatus as defined in claim 1 wherein said bearing means comprises roller bearings.

3. A drive transmitting apparatus as defined in claim 1, wherein said bearing means comprises bearing metal.

4. A drive transmitting apparatus as defined in claim 1 wherein said annular elastic means is arranged around the outer end of said support shafts between the support shafts and the respective rollers.

5. A drive transmitting apparatus as defined in claim 1, wherein said annular elastic means is arranged around the inner end of said support shafts between the support shafts and the central shaft.

6. A drive transmitting apparatus as defined in claim 1 wherein said rollers comprise a material selected from the group consisting of metal, rubber and plastics.

7. A drive transmitting apparatus as defined in claim 1 wherein said projections comprise helical surfaces for engaging said roller surfaces.

8. A drive transmitting apparatus as defined in claim 1 wherein said roller screw member is adapted for axial movement and said rail member is fixed against axial movement.

9. A drive transmitting apparatus as defined in claim 1 wherein said rail member is adapted for axial movement and said roller screw member is fixed against axial movement.

10. A drive transmitting apparatus as defined in claim 1 wherein the surfaces of said rollers comprise an elastic material.

11. A drive transmitting apparatus as defined in claim 1 wherein a second rail member is arranged adjacent the opposite side of said roller screw member and parallel with the axis of said central shaft.

* * * * *